(12) United States Patent
Assa et al.

(10) Patent No.: US 6,612,335 B1
(45) Date of Patent: Sep. 2, 2003

(54) 3-WAY CONTROL VALVE

(75) Inventors: Igal Assa, Hof Ashkelon (IL); Ra'anan Ben-Horin, Jordan Valley (IL)

(73) Assignee: Arkal Filtration Systems C.S. Ltd., Jordan Valley (IL)

( * ) Notice: Subject to any disclaimer, the term of this patent is extended or adjusted under 35 U.S.C. 154(b) by 0 days.

(21) Appl. No.: 09/544,926

(22) Filed: Apr. 7, 2000

Related U.S. Application Data (63) Continuation of application No. PCT/IL98/00425, filed on Sep. 1, 1998, now abandoned.

(51) Int. Cl.⁷ .............................................. F16K 11/00
(52) U.S. Cl. .................. 137/596.18; 137/863; 137/869; 210/425
(58) Field of Search ........................... 137/596.18, 863, 137/869; 210/425

(56) References Cited

U.S. PATENT DOCUMENTS

| | | | |
|---|---|---|---|
| 2,372,940 A | * 4/1945 | Ellis | 137/218 |
| 3,476,353 A | 11/1969 | Stampfli | 251/45 |
| 4,230,141 A | 10/1980 | Phillips | 137/103 |
| 4,714,551 A | 12/1987 | Bachhofer et al. | 210/278 |
| 4,862,914 A | 9/1989 | Weingarten | 137/544 |

FOREIGN PATENT DOCUMENTS

| | | |
|---|---|---|
| FR | 2067442 | 8/1971 |
| IL | 85699 | 3/1988 |

* cited by examiner

Primary Examiner—Gerald A. Michalsky
(74) Attorney, Agent, or Firm—Fitch, Even, Tabin & Flannery

(57) ABSTRACT

A 3-way hydraulic valve comprising a body formed with an inlet port for connecting to a pressurized supply line, a first outlet port for connecting to an outlet line and being in flow communication with the inlet port, a gate intermediate the inlet port and the first outlet port, dividing the body into an inlet chamber and an outlet chamber, the body further comprises a second outlet extending from the outlet chamber, and a control chamber fitted with a deformable diaphragm sealingly engageable with the gate so as to prevent flow between the inlet port and the first outlet port, and a sealing port associated with the second outlet and comprising a sealing member linearly displaceable between a closed and an open position. The sealing member is attached to the diaphragm by a linking element having at least two degrees of freedom, whereby when the diaphragm engages the gate, the sealing port is opened and when the diaphragm disengages from the gate the sealing port is closed and disengagement of the diaphragm from the gate entails closing of the sealing port by the sealing member.

16 Claims, 5 Drawing Sheets

3-WAY CONTROL VALVE

This is a continuation, of prior International Application number PCT/IL98/00425 filed Sep. 1, 1998 now abandoned and designating the United States of America, which is hereby incorporated herein by reference in its entirety.

FIELD OF THE INVENTION

The present invention is in the field of the hydraulic control valves and more specifically it is concerned with a 3-way control valve of the type having a single control chamber and which is suitable for use, for example, as a flushing valve. The present invention aims at an improvement of such valves.

BACKGROUND OF THE INVENTION

A 3-way control valve is typically used in a pressurized liquid line, for opening or closing one or two outlets, responsive to a control signal or depending on flow conditions of the pressurized line. e.g. pressure. Such a valve, may be used, for example, as a back-flushing valve fitted on a supply line and connected in series to a filtering device. In the normal course of operation, when an inlet chamber of the valve is pressurized and a control chamber of the valve is vented, the valve is in an open position allowing flow towards a first outlet chamber (e.g. towards the filtering device) with a second outlet chamber being in a closed position. However, when the inlet port is not pressurized and the control chamber is pressurized, then the valve will close to a position allowing back-flow in a direction from the first outlet towards the second outlet. Typically, the second outlet will be a flushing outlet as known in the art.

A serious problem occurring with 3-way valves, in particular with back-flushing valves, is that essentially high pressures are involves and accordingly strong forces develop within the valve, entailing high mechanical stress in the components thereof. This requires rigid and heavy structures and eliminates the use of plastic materials owing to high moments developing in the construction. In particular, this problem occurs in 3-way valves of the type comprising a control chamber with a diaphragm in which the two outlet ports are essentially aligned and wherein the inlet port is essentially vertical to the outlet ports (at times referred to as non-aligned filtering flow valves).

Owing to the high pressure and forces acting in such valves, the wear of the moving parts is essentially high resulting in that such valves must be frequently serviced and checked for defaults.

It is the object of the present invention to provide an improved 3-way control valve in which the above problems or disadvantages are significantly reduced or overcome.

BRIEF SUMMARY OF THE INVENTION

According to the present invention there is provided a 3-way hydraulic valve comprising a body formed with an inlet port for connecting to a pressurized supply line, a first outlet port for connecting to an outlet line and being in flow communication with the inlet port and a gate intermediate the inlet port and the first outlet port, dividing the body into an inlet chamber and an outlet chamber, the body further comprises a second outlet extending from the outlet chamber, and a control chamber fitted with a deformable diaphragm sealingly engageable with the gate so as to prevent flow between the inlet port and the first outlet port and a sealing port associated with the second outlet and comprising a sealing member linearly displaceable between a closed and an open position, said sealing member being attached to the diaphragm whereby when the diaphragm engages the gate said sealing port is open and when the diaphragm disengages from the gate said sealing port is closed, the valve being characterized in that the sealing member is attached to the diaphragm by a linking element having at least two degrees of freedom and whereby disengagement of the diaphragm from the gate entails closing of the sealing port by said sealing member.

By a preferred application of the present invention the second outlet is a flushing outlet whereby back-flushing is performed by flushing liquid flowing in a direction from the first outlet towards the second outlet.

By a first embodiment, the linking element is a rigid link pivotally connected at one end thereof to the diaphragm and at an opposed end thereof to the sealing member. Alternatively, the linking element may be a flexible element such as a strip of material. e.g. plastic or metal. The linking element may also be a cable, a cord or a string made of a variety of materials such as rope, metal, fibers, rubber and elastomers etc.

Preferably, the sealing member is spring biased into sealing engagement with the sealing port when the supply line is not pressurized and when the control chamber is vented.

In order to eliminate friction and reduce forces acting in the valve, the sealing member is restrained from displacement with respect the sealing port accept for linear displacement along its longitudinal axis. By one application, the sealing member comprises radially extending male-female type engagement restricting ribs, one of these being provided on the sealing member and the other at corresponding portions of the sealing port integrally formed with the body or of a sleeve member fixedly retained within the sealing port.

By another application, the sealing member is slidably retained over at least one positioning rod extending parallel to a longitudinal axis of the sealing port.

In order to increase the sealing force of the diaphragm against the gate, an engagement surface of the gate is offset from an axis of symmetry of the diaphragm whereby the surface area of the diaphragm corresponding with the inlet chamber is smaller than that of the outlet chamber. Preferably, the axis of symmetry of the diaphragm is essentially perpendicular to a flow axis of the valve extending between the inlet port and the first outlet port.

By still a preferred embodiment of the present invention a portion of the face of the diaphragm within the control chamber is fitted with a rigid plate element and there is a restraining element extending from a wall of the control chamber, whereby upon disengagement of the diaphragm from the gate, the plate element encounters the restraining element for dampening the displacement and deformation of the diaphragm. Preferably, the plate element performs a combined rolling and sliding motion over a tip of the restraining element. Said restraining element is for example a pin or a rib.

BRIEF DESCRIPTION OF THE DRAWINGS

For better understanding, the invention will now be described by way of example only, with reference to the accompanying drawings, in which.

DETAILED DESCRIPTION OF A SPECIFIC EMBODIMENT

Figure 1:
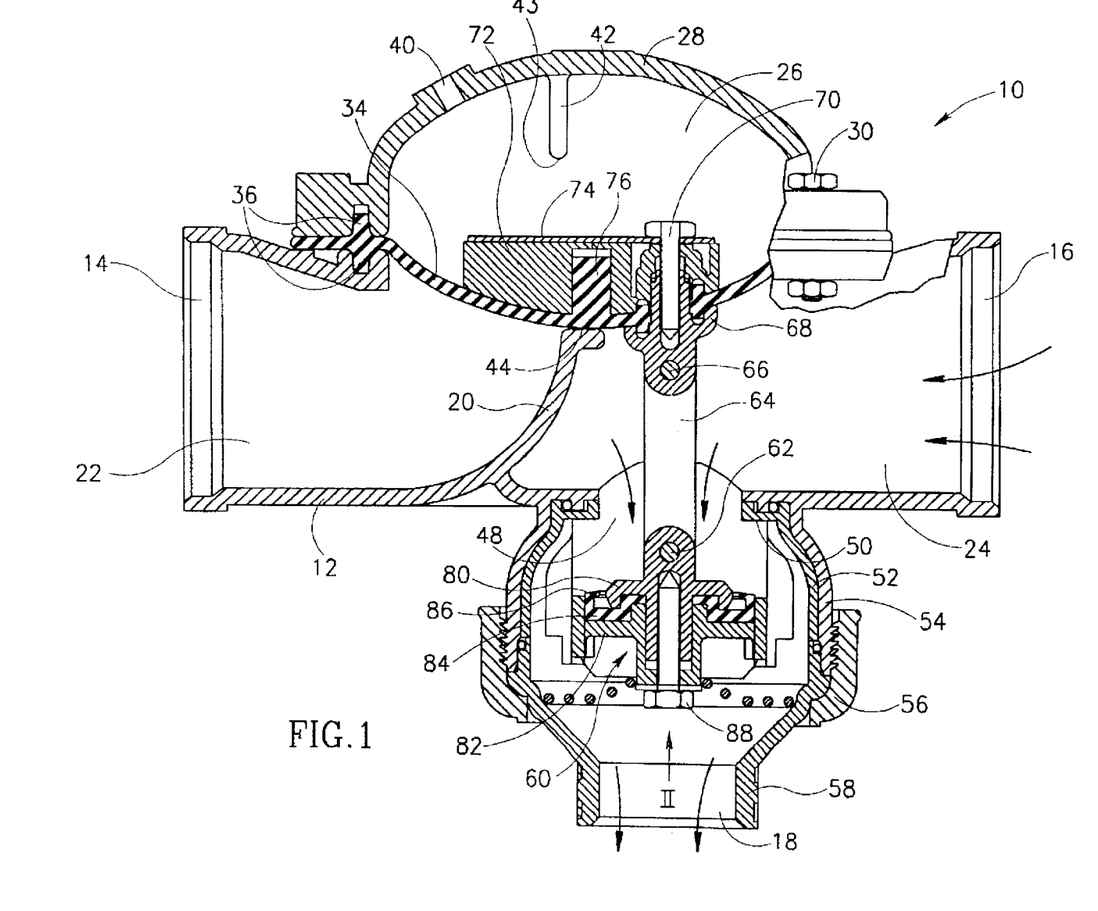
FIG. 1 is a longitudinal cross-section through a 3-way valve in accordance with the present invention, the valve in its back-flushing position.

The 3-way valve 10 seen in FIG. 1 is a flushing valve having an essentially T-like body 12 fitted with an inlet port 14, an essentially aligned first outlet port 16 and a second outlet port 18 at a leg portion of the body 12. The second outlet port 18 is at times referred to as "a flushing port". 3-way valves of this type are typically used in water supply lines and are connected in series td a filter device (not shown) connected to the first outlet port 16. Such 3-way valves are at times referred to as "in-line filtering valves". Body 12 further comprises a gate member 20 defining an inlet chamber 22 and an outlet chamber 24.

At a top portion of the body there is a control chamber 26 fitted with a cover 28 secured to the body by bolts 30 clampingly securing a diaphragm in the shape of spherical segment and which comprises annular ribs 36 projecting from its top and bottom surfaces for sealing engagement with respective grooves of the housing 12 and the top cover 28. Cover 28 further comprises a control signal port 40 (which may be connected to the supply line) and a restraining elemin the form of a rib 42 projecting downward from its top surface and having a rounded tip 43, the purpose of which will hereinafter be explained in more detail.

In the position seen in FIG. 1, the diaphragm 34 sealingly engages an engagement surface 44 of gate member 20, thus closing the path between the inlet chamber 22 and the outlet chamber 24.

Extending from the outlet chamber 24 there is a second outlet 48 formed with a sealing surface 50 of replaceable sleeve member 52 retained within the cylindric portion 54 by means of coupling member 56 which also secures the outlet's nozzle 58. A sealing member generally designated 60 is received within the second outlet 48 and as will hereinafter be explained is restricted to perform linear displacement only. The sealing member 60 is pivotally connected at 62 to rigid link element 64 which at its opposed end 66 is pivotally connected to a connecting element 68 connected in turn to diaphragm 34 by bolt 70. The arrangement is such that the link element has two degrees of freedom. Bolt 70 further secures the rigid support element 72 and plate 74 over projection 76 of the diaphragm 34.

Figure 3:
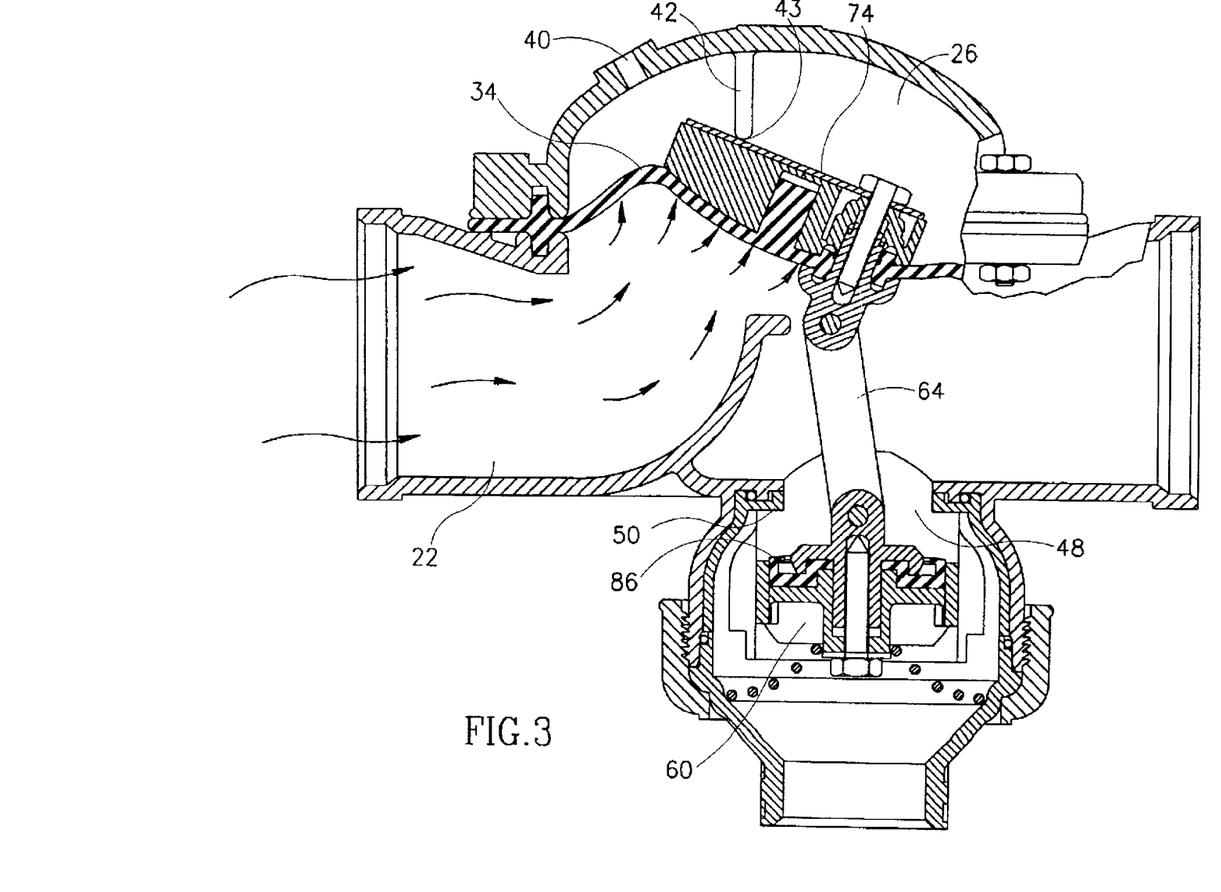
FIG. 3 illustrates the valve of FIG. 1 in a mid position of the diaphragm and prior to closing the flushing port.

The sealing member 60 comprises a top seal clamp 80 and a bottom seal clamp 82, which together clampingly support seal 84 formed with an annular skirt like portion 86 at its top portion for improved sealing engagement with sealing portion 50 as seen in FIG. 3. Both seal clamps 80 and 82 and the seal 84 are tightly secured by bolt 88.

In the position seen in FIG. 1, the diaphragm 34 sealingly abuts against the sealing surface 44 of gate member 20, thus closing flow communication between the inlet chamber 22 and the outlet chamber 24. Biasing the diaphragm 34 into this sealing position occurs, for example, upon applying a hydraulic control signal via control signal port 40 as known per se. Such a control signal may be, for example, a pneumatic signal or, a hydraulic signal which might be at the same pressure as of the supply line (not shown) connected to inlet port 14. When the valve is in its open position, as seen for example in FIG. 4, the surface area of the diaphragm 34 within chamber 26 is essentially similar to the surface area of the diaphragm at its opposed face (facing the inlet chamber 22 and the outlet chamber 24). However, upon applying pressure within the control chamber 26 as at the inlet chamber 22, the diaphragm will deflect to the position seen in FIG. 1, owing to pressure acting on the top surface of the sealing member 60, thus entailing downward displacement of the sealing member 60 to disengage from the sealing surface 50 as seen in FIG. 1. In the position of FIG. 1, back-flushing may take place by flowing flushing water (for example from a filter connected in series to the outlet port 16) via outlet chamber 24, through the second outlet 48 and through the second outlet port 18.

Figure 2:
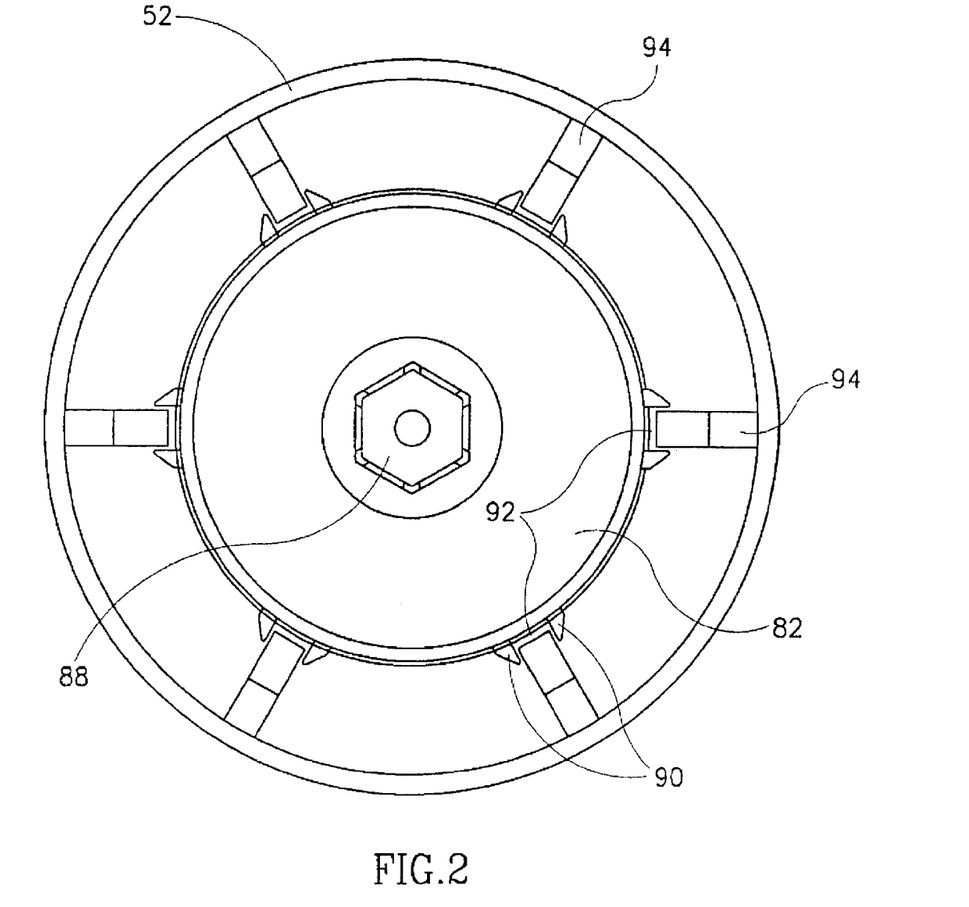
FIG. 2 is a view in direction of arrow II in FIG. 1 showing only the sealing member and a retaining sleeve.

In order to minimize the forces acting on the components of the valve and consequently the mechanical stress, it is required to decrease friction and moments acting between the moving parts and the body. This is obtained by ensuring smooth displacement of the sealing member 60 in a linear direction only, i.e. along its longitudinal axis, preventing it from rotating about its longitudinal axis or from tilting about this axis, in spite the complex motion of the diaphragm 34 during its displacement, as will be explained hereinafter. In order to ensure that the sealing member 60 displaces only in a linear direction, the bottom clamp 82 is provided with a plurality of pairs of radially projecting ribs 90 each pair constituting a longitudinal groove 92 receiving a corresponding rib 94 radially and inwardly projecting from the insert 52 as can best be seen in FIG. 2. In order to service the sealing member 60 or to replace the sleeve 52, e.g. in case of wear of the radial projections 94, coupling 56 is opened and access is admitted.

Figure 4:
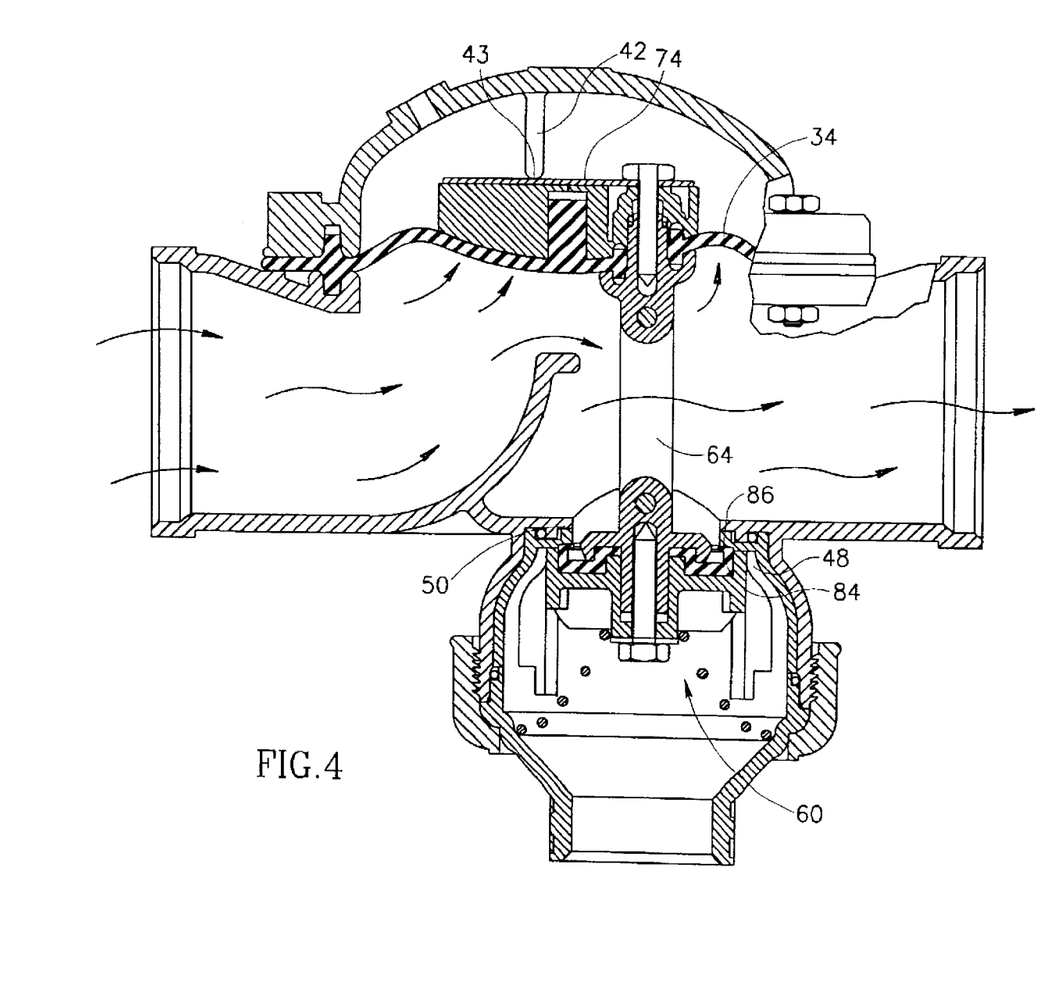
FIG. 4 is a longitudinal cross-section through the valve seen in FIG. 1, with the second outlet in its sealed position.

Further attention is now directed to FIGS. 3 and 4 of the drawings illustrating consecutive positions of displacement of the diaphragm 34 from its engaging position seen in FIG. 1 to its fully open position seen in FIG. 4. When the control chamber 26 is vented, and upon pressurizing the inlet chamber 22, a portion of the diaphragm 34 being in flow communication with the inlet chamber 22 deforms under pressure of the flowing water as seen in FIG. 3, until the plate 74 encounters the rounded tip 43 of rib 42. In this situation when fluid pressure at the bottom surface of the diaphragm continues, diaphragm 34 continues to deform with plate 74 performing a combined sliding and rocking motion over the rounded tip 43 of rib 42 until it reaches its steady state as seen in FIG. 4. This arrangement reduces the forces acting on the sealing member 60 and prevents a shock which would have occurred if the diaphragm would reach its final position of FIG. 4 at one stroke, which might result in fraction or excessive wear of the valve or its components. As seen in FIG. 3, the linking element 64 is slightly inclined as it adjusts to the distortion of the diaphragm 34 in the intermediate position seen in this figure, as explained hereinabove.

Upon completing the deformation of the diaphragm 34 to its fully open position as seen in FIG. 4, i.e. when the inlet chamber 22 and the outlet chamber 24 are in flow communication, the sealing skirt 86 of seal member 84 sealingly abuts against the sealing surface 50, closing the second outlet 48. It will further be noted from the figures, in particular see FIG. 1, that the sealing surface 44 of the gate member 20 is slightly offset from the axis of symmetry of the diaphragm 34. This arrangement ensures that the surface area of the diaphragm corresponding with the inlet chamber 22 is somewhat smaller than the surface area corresponding with the outlet chamber 24 and accordingly the sealing force of the diaphragm 34 against the gate member 20 is increased.

Figure 5:
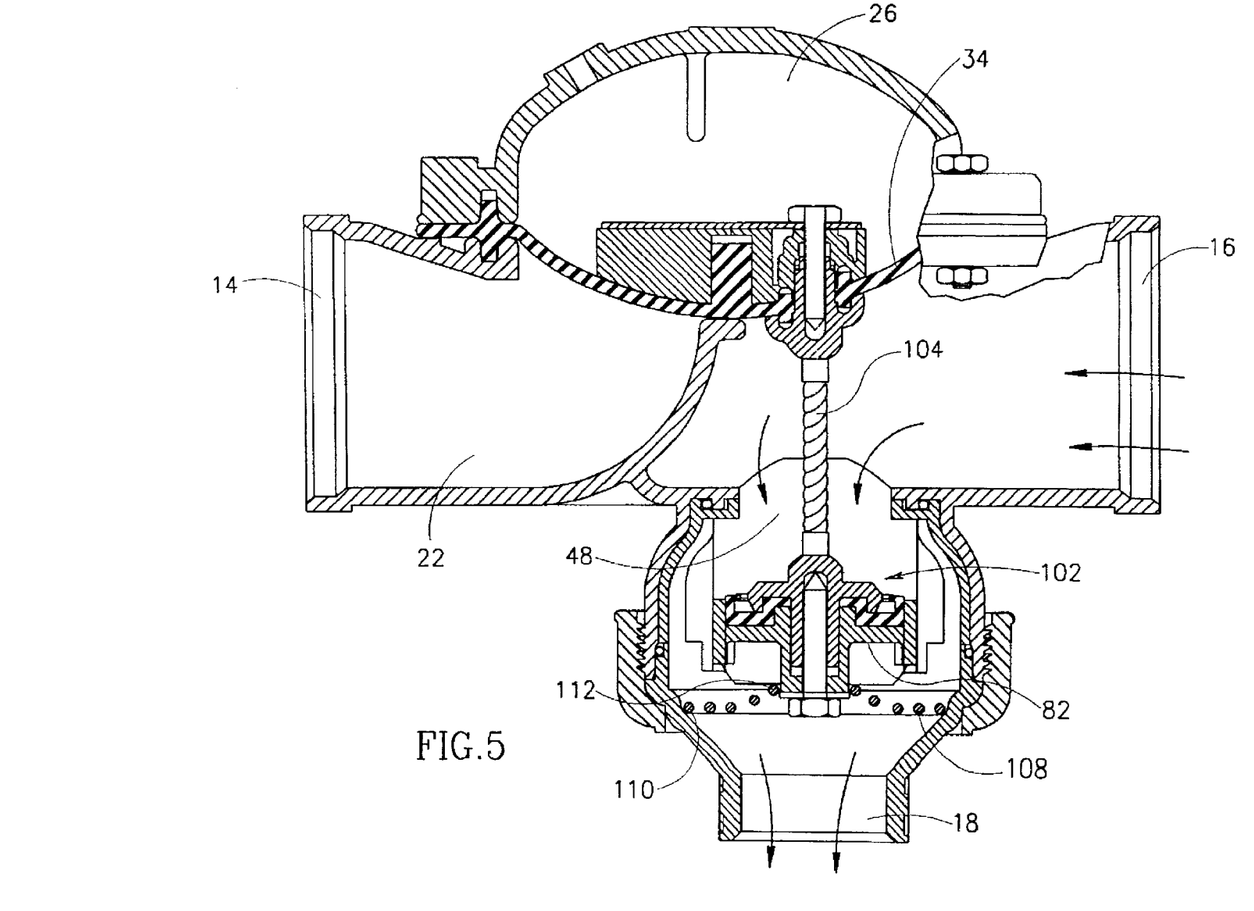
FIG. 5 illustrates a further application of the valve seen in FIG. 1 wherein the link element is a rope.

Attention is now directed to FIG. 5 illustrating a further application of the present invention which in principle is similar to the previous application and accordingly reference is made only to those components which differ and those elements which are similar to the elements described hereinbefore are designated by the same reference numerals.

In this application the sealing member generally designated 102 is connected to the diaphragm 34 by a flexible wire element 104 which may be for example, a cable, a cord, a string, etc. It will be appreciated that this element may also be a strip of material e.g. metal or plastic, for obtaining the same effect as explained in connection with the previous application, having at least two degrees of freedom, whereby the sealing member 102 performs only linear displacement within the second outlet 48 while the diaphragm may perform a complex motion.

It will be appreciated that opening of the sealing member 102 to the position seen in FIG. 5 is obtained by pressure of the back-flushing water flowing in the direction from the first outlet port 16 towards the second outlet port 18 and by pressure applied via the control chamber 26 acting on the diaphragm 34. Closing the second outlet 48 is in the same manner as explained in connection with FIGS. 3 and 4 in which the diaphragm 34 deforms to the position of FIG. 4 entailing pulling of the sealing member 102 to its sealing position (not shown).

In order to prevent draining of the supply line (not shown) connected to the inlet port 14, there is provided a coiled spring 108 bearing at one end against a shoulder 110 of the outlet port 18 and at an opposed end against shoulder 112 of the bottom clamping member 82. It is thus ensured that when the inlet chamber 22 and the control chamber 26 are vented, the sealing member 102 displaces to its closed position (not shown).

Although not shown, a skilled person will appreciate that restricting the sealing element to linear motion only may be carried out also by a single ribbed positioning rod centrally extending at the outlet port, or two or more smooth positioning rods over which the sealing element slides.

It will be appreciated by a skilled person that the construction of the valve of the present invention essentially decreases forces and moments developing within the valve as a result of displacement of the sealing components, thus enabling operation of the valve at essentially high pressure. e.g. in the range of up to 10 atmospheres, that in spite the fact that the body may be made of a plastic material.

What is claimed is:

1. A 3-way hydraulic valve comprising a body formed with an inlet port for connecting to a pressurized supply line, a first outlet port for connecting to an outlet line and being in flow communication with the inlet port, a gate intermediate the inlet port and the first outlet port, dividing the body into an inlet chamber and an outlet chamber, the body further comprises a second outlet port extending from the outlet chamber, a control chamber fitted with a deformable diaphragm engageable with the gate so as to prevent flow between the inlet port and the first outlet port, and a sealing port associated with the second outlet port and comprising a sealing member linearly displaceable between a closed and an open position, said sealing member being associated with the diaphragm so that when the diaphragm engages the gate said sealing port is open and when the diaphragm disengages from the gate said sealing port is closed by said sealing member, wherein the peripheral portion of the deformable diaphragm is secured to a valve housing, and the sealing member is engaged with the diaphragm by a linking element having at least two degrees of freedom.

2. A 3-way hydraulic valve according to claim 1, wherein said linking element is a rigid link pivotally connected at one end thereof to the diaphragm and at an opposed end thereof to the sealing member.

3. A 3-way hydraulic valve according to claim 1, wherein said linking element is a flexible element.

4. A 3-way hydraulic valve according to claim 3, wherein said flexible linking element is a strip of material.

5. A 3-way hydraulic valve according to claim 1, wherein said linking element is a cable or a string.

6. A 3-way hydraulic valve according to claim 1, wherein the sealing member is spring biased into sealing engagement with the sealing port when the supply line is pressurized and when the control chamber is vented.

7. A 3-way hydraulic valve according to claim 1, wherein the sealing member is restrained from displacement with respect to the sealing port except for linear displacement along its longitudinal axis.

8. A 3-way hydraulic valve according to claim 7, wherein the sealing member comprises radially extending male-female type engagement restricting ribs and grooves, one of these being provided on the sealing member and the other at corresponding portions of the sealing port.

9. A 3-way hydraulic valve according to claim 7, wherein the sealing member is retained within a sleeve member with possibility for sliding along the longitudinal axis of the sealing port.

10. A 3-way hydraulic valve according to claim 1, wherein an engagement surface of the gate is offset from an axis of symmetry of the diaphragm whereby the surface area of the diaphragm corresponding with the inlet chamber is smaller than that of the outlet chamber.

11. A 3-way hydraulic valve according to claim 10, wherein the axis of symmetry of the diaphragm is essentially perpendicular to a flow axis of the valve extending between the inlet port and the first outlet port.

12. A 3-way hydraulic valve according to claim 1, wherein a portion of the face of the diaphragm within the control chamber is fitted with a rigid plate element and there is a restraining element extending from a wall of the control chamber, whereby upon disengagement of the diaphragm from the gate the plate element encounters the restraining element for dampening displacement and deformation of the diaphragm.

13. A 3-way hydraulic valve according to claim 12, wherein the plate element performs a combined rolling and sliding motion over a tip of the restraining element.

14. A 3-way hydraulic valve, comprising:

an inlet port for connecting to a pressurized supply line,
a first outlet port for connecting to an outlet line and being in flow communication with the inlet flow,
a gate positioned between the inlet port and the first outlet port, forming an inlet chamber and an outlet chamber,
a second outlet port extending from the outlet chamber,
a control chamber fitted with a deformable diaphragm engageable with the gate so as to prevent flow between the inlet port and the first outlet port, an engagement surface of the gate being offset from an axis of symmetry of the diaphragm and the surface area of the diaphragm corresponding with the inlet chamber being smaller than that of the outlet chamber, a sealing port associated with the second outlet port and comprising a sealing member linearly displaceable between a closed position and an open position, said sealing member being pivotally connected with the diaphragm by a linking element having at least two degrees of freedom, wherein when the diaphragm engages the gate said sealing port is open, and when the diaphragm disengages from the gate said sealing port is closed by said sealing member.

15. A 3-way hydraulic valve according to claim 14, wherein the axis of symmetry of the diaphragm is essentially perpendicular to a flow axis of the valve extending between the inlet port and the first outlet port.

16. A 3-way hydraulic valve comprising:

a body formed with an inlet port for connecting to a pressurized supply line, a first outlet port for connecting to an outlet line, the first outlet port being sufficiently aligned with the inlet port, a gate intermediate the inlet port and the first outlet port, dividing the body into an inlet chamber and an outlet chamber, the body further comprises a second outlet port extending from the outlet chamber, a control chamber fitted with a deformable diaphragm engageable with the gate so as to prevent flow between the inlet port and the first outlet port, and a sealing port associated with the second outlet port and comprising a sealing member linearly displaceable between a closed and an open position, said sealing member being associated with the diaphragm so that when the diaphragm engages the gate said sealing port is open and when the diaphragm disengages from the gate said sealing port is closed by said sealing member, wherein the sealing member is engaged with the diaphragm by a linking element having at least two degrees of freedom and is restrained from displacement with respect to the sealing port, except for linear displacement along its longitudinal axis by radially extending male-female type engagement restricting ribs and grooves, one of these being provided on the sealing member and the other at corresponding portions of the sealing port.

* * * * *

UNITED STATES PATENT AND TRADEMARK OFFICE
CERTIFICATE OF CORRECTION

PATENT NO.    : 6,612,335 B1
DATED         : September 2, 2003
INVENTOR(S)   : Assa et al.

It is certified that error appears in the above-identified patent and that said Letters Patent is hereby corrected as shown below:

Title page,
Insert Item:
-- [30]   Foreign Application Priority Data:
October 15, 1997 [IL] Israel ... 121988 --.
Item [73], Assignee, should read -- Arkal Filtration Systems C. S. LTD and Dorot Valve Manufacturers --.

Signed and Sealed this

Sixth Day of December, 2005

JON W. DUDAS
*Director of the United States Patent and Trademark Office*